(12) United States Patent
Shimura et al.

(10) Patent No.: US 11,434,350 B2
(45) Date of Patent: Sep. 6, 2022

(54) CELLULOSE RESIN COMPOSITION, MOLDED BODY AND PRODUCT USING SAME, AND A METHOD FOR PRODUCING CELLULOSE RESIN COMPOSITION

(71) Applicant: NEC CORPORATION, Tokyo (JP)

(72) Inventors: Midori Shimura, Tokyo (JP); Shukichi Tanaka, Tokyo (JP); Kiyohiko Toyama, Tokyo (JP); Masatoshi Iji, Tokyo (JP); Mina Shimizu, Tokyo (JP); Toshie Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 16/772,422

(22) PCT Filed: Dec. 17, 2018

(86) PCT No.: PCT/JP2018/046429
§ 371 (c)(1),
(2) Date: Jun. 12, 2020

(87) PCT Pub. No.: WO2019/117315
PCT Pub. Date: Jun. 20, 2019

(65) Prior Publication Data
US 2021/0070966 A1 Mar. 11, 2021

(30) Foreign Application Priority Data
Dec. 15, 2017 (JP) .............. JP2017-241069

(51) Int. Cl.
| | | |
|---|---|---|
| C08L 1/14 | (2006.01) | |
| C08G 18/71 | (2006.01) | |
| C08K 3/04 | (2006.01) | |
| C08K 3/36 | (2006.01) | |
| C08K 5/098 | (2006.01) | |
| C08K 5/20 | (2006.01) | |
| C08K 5/21 | (2006.01) | |
| C08L 1/28 | (2006.01) | |
| C08L 83/04 | (2006.01) | |

(52) U.S. Cl.
CPC .............. *C08L 1/14* (2013.01); *C08G 18/71* (2013.01); *C08K 3/04* (2013.01); *C08K 3/36* (2013.01); *C08K 5/098* (2013.01); *C08K 5/20* (2013.01); *C08K 5/21* (2013.01); *C08L 1/288* (2013.01); *C08L 83/04* (2013.01)

(58) Field of Classification Search
CPC . C08L 83/04; C08L 1/288; C08L 1/14; C08K 5/21; C08K 5/20; C08K 5/098; C08K 3/36; C08K 3/04; C08G 18/71
See application file for complete search history.

(56) References Cited

U.S. PATENT DOCUMENTS

2009/0075048 A1 3/2009 Mukunoki

FOREIGN PATENT DOCUMENTS

| JP | 63-69846 B2 | 3/1988 |
|---|---|---|
| JP | 2002-265639 A | 9/2002 |
| JP | 2003-138062 A | 5/2003 |
| JP | 2005-132970 A | 5/2005 |
| JP | 2007-100260 A | 4/2007 |
| JP | 2010-121121 A | 6/2010 |
| JP | 2011-132453 A | 7/2011 |
| JP | 2013-112781 A | 6/2013 |
| JP | 2015-172150 A | 10/2015 |
| JP | 2017-078131 A | 4/2017 |
| WO | 2016/067662 A1 | 5/2012 |
| WO | 2013/147143 A1 | 10/2013 |
| WO | 2013/180278 A1 | 12/2013 |
| WO | 2017/061190 A1 | 4/2017 |

OTHER PUBLICATIONS

English Machine Translation JP2010121121 obtained at: https://worldwide.espacenet.com/publicationDetails/biblio?CC=JP&NR=2010121121A&KC=A&FT=D&ND=3&date=20100603&DB=EPODOC&locale=en_EP# (Year: 2010).*
Daisuke Sawai et al., "Development of New Cellulose-based Polymers with Excellent Meltprocessability", FUJIFILM Research & Development, 2012, Mar. 28, 2012, No. 57, p. 55-57.
International Search Report of PCT/JP2018/046429 dated Mar. 5, 2019 [PCT/ISA/210].
Extended European Search Report far EP Application No. 18889256.6 dated Jan. 25, 2021.

\* cited by examiner

*Primary Examiner* — Arrie L Reuther
(74) *Attorney, Agent, or Firm* — Sughrue Mion, PLLC

(57) ABSTRACT

A cellulose resin composition comprising a cellulose derivative (A) and a lubricant (B), wherein the cellulose derivative (A) is a cellulose derivative obtained by substituting at least a part of hydrogen atoms of hydroxyl groups of a cellulose with a short-chain organic group having 2 to 4 carbon atoms and a long-chain organic group having 8 to 30 carbon atoms with specific degrees of substitution; the lubricant (B) is at least one selected from the group consisting of a urea compound (B1) having a urea group (—NH—C(=O)—NH—) and an acyclic aliphatic group having 6 to 33 carbon atoms, an amide compound (B2) having an amide group (—C(=O)—NH—) and an acyclic aliphatic group having 6 to 33 carbon atoms, a fatty acid metal salt (B3), and a silicone-based lubricant (B4); and a content of the lubricant (B) is in a range of 0.1 to 10% by mass. A cellulose resin composition capable of forming a molded body having a high-quality appearance and scratch resistance is provided.

12 Claims, No Drawings

CELLULOSE RESIN COMPOSITION, MOLDED BODY AND PRODUCT USING SAME, AND A METHOD FOR PRODUCING CELLULOSE RESIN COMPOSITION

CROSS REFERENCE TO RELATED APPLICATIONS

This application is a National Stage of International Application No. PCT/JP2018/046429, filed Dec. 17, 2018, claiming priority to Japanese Patent Application No. 2017-241069, filed Dec. 15, 2017, the contents of all of which are incorporated herein by reference in their entirety.

TECHNICAL FIELD

The present invention relates to a cellulose resin composition, a molded body formed of the resin composition, a product using the molded body, and a method for producing the cellulose resin composition.

BACKGROUND ART

Bioplastics made from vegetable law materials can contribute to countermeasures against petroleum depletion and global warming, and has been started being used in general products such as packaging, containers and fibers but also in durable products such as electronic equipment and automobiles.

However, conventional bioplastics, such as polylactic acid, polyhydroxyalkanates, modified starch, are all made of starch-based materials, i.e., edible parts. Therefore, in view of concerns about food shortages in the future, the development of new bioplastics using non-edible parts as raw materials is required.

As a raw material of the non-edible part, cellulose, which is a main component of wood and vegetation, is typical, and various bioplastics using the cellulose have been developed and commercialized.

As cellulose, pulp obtained by chemically separating lignin or hemicellulose from wood or the like with the help of a chemical agent is known. Alternatively, since cotton is almost made of cellulose, it can be used as it is. Such a cellulose, which is a polymer formed by polymerization of β-glucose, has a strong intermolecular force due to hydrogen bonds because it has many hydroxy groups. Therefore, it is hard and brittle, does not have thermoplasticity, and is low in solvent solubility except for a special solvent. In addition, since the cellulose has many hydroxyl groups, which are hydrophilic groups, water absorption is high and water resistance is low.

Various studies have been conducted to modify such a cellulose.

As a method of modifying cellulose, a method of replacing a hydrogen atom of a hydroxyl group of cellulose with a short-chain organic group such as an acetyl group is known. According to this method, since the number of hydroxyl groups can be reduced, the intermolecular force of cellulose can be reduced. Furthermore, since cellulose modified with only a short chain organic group such as an acetyl group has insufficient thermoplasticity and water resistance, a long chain organic group having a higher carbon number is introduced into cellulose in addition to the short chain organic group. The introduced long-chain organic group functions as a hydrophobic internal plasticizer, and the thermoplastic property and water resistance of the cellulose derivative are improved.

For example, Patent Literature 1 discloses a resin composition containing a cellulose derivative having groups formed by substituting hydrogen atoms of hydroxyl groups included in a cellulose with a hydrocarbon group and an acyl group, and a lubricant. The literature discloses that a molded body formed of this composition is excellent in thermoplasticity, moldability, impact resistance, and the like.

Patent Literature 2 describes a cellulose derivative produced by substituting at least a part of hydrogen atoms of hydroxy groups of a cellulose with an aliphatic acyl group having 2 to 4 carbon atoms and an aliphatic acyl group having 5 to 20 carbon atoms, and that the cellulose derivative has satisfactory impact resistance and fracture elongation in addition to thermoplasticity and water resistance, and is suitable for molding process.

Patent Literature 3 shows a cellulose acylate obtained by substituting a hydroxyl group of cellulose with an acetyl group and an acyl group having 3 to 22 carbon atoms at a specific degree of substitution, and it is described that a film of the cellulose acylate has excellent physical properties and can be produced by a solvent casting method.

Patent Literature 4 describes a method of producing a cellulose derivative by forming a cellulose derivative in which a long-chain organic group having 5 or more carbon atoms and a short-chain organic group having 4 or less carbon atoms are bonded using hydroxyl groups of cellulose in a swollen state, and performing solid-liquid separation.

Non-Patent Literature 1 describes that a material having thermoplasticity and excellent balance of rigidity/shock-resistance/heat-resistance can be provided by introducing an acetyl group together with a 2-ethylhexanoyl group into a cellulose.

On another front, it has been recently desired to develop a resin molding having high external-appearance quality without coating. If a resin molding is not coated, cost for discharging volatile organic compounds (VOC) during a production process and coating cost can be saved. As for the molding obtained, a negative change in appearance caused by removal and degradation of coating can be overcome.

For example, Patent Literature 5 describes a thermoplastic resin composition containing a graft copolymer formed of a rubber polymer, a copolymer formed of a predetermined vinyl monomer, a predetermined polyester, and carbon black and/or a dye serving as a colorant in a predetermined ratio. The literature also states that an injection molding obtained by injection-molding the composition has high impact resistance and high external-appearance quality (glossy and jet-black color).

Patent Literature 6 describes a black resin composition containing a predetermined copolymerized polycarbonate resin, a colorant (carbon black and/or black organic dye) and a hindered amine based stabilizer and having specific properties (pencil hardness, low-temperature impact resistance, brittle fracture rate, glossiness, brightness). The literature also states that the black molding of the black resin composition has an excellent jet-black color and excellent low-temperature impact resistance, weather resistance, abrasion-resistance and heat-resistance.

Patent Literature 7 describes a black resin composition containing a predetermined copolymerized polycarbonate resin, a styrene resin, an impact modifier (rubber-modified resin) and carbon black in a predetermined blending ratio. The literature also states that a molding of the black resin composition has excellent jet-black color and excellent impact resistance, flowability, abrasion-resistance and heat-resistance.

Patent Literature 8 describes a thermoplastic resin composition containing a predetermined graft copolymer (1 to 99 parts by mass), a vinyl copolymer (99 to 1 part by mass), and other thermoplastic resins (0 to 80 parts by mass) and also containing a predetermined organic dye. The literature also states that a molded body of the composition is excellent in impact resistance, weather resistance, jet-black color, surface smoothness and abrasion-resistance. The literature also states that the thermoplastic resin composition of Comparative Example 3, which contains a pigment (carbon black: Mitsubishi carbon #2600 (trade name) manufactured by Mitsubishi Chemical Corporation) in place of an organic dye, is unsatisfactory in jet-black color and surface smoothness.

CITATION LIST

Patent Literature

Patent Literature 1: JP2011-132453A
Patent Literature 2: JP2010-121121A
Patent Literature 3: JP2002-265639A
Patent Literature 4: WO2016/067662A1
Patent Literature 5: WO2013/147143A1
Patent Literature 6: JP2015-172150A
Patent Literature 7: JP2013-112781A
Patent Literature 8: JP2005-132970A Non-Patent Literature Non-Patent Literature 1: FUJIFILM RESEACH & DEVELOPMENT (No. 57-2012), Mar. 28, 2012, No. 57, p. 55-57

SUMMARY OF INVENTION

Technical Problem

An object of the present invention is to provide a cellulose resin composition capable of forming a molded body having a high-quality appearance and scratch resistance, a molded body formed by using the resin composition, and a product using the molded body.

Solution to Problem

According to an aspect of the present invention, there is provided a cellulose resin composition comprising a cellulose derivative (A) and a lubricant (B), wherein the cellulose derivative (A) is a cellulose derivative obtained by substituting at least a part of hydrogen atoms of hydroxy groups of a cellulose with a short-chain organic group having 2 to 4 carbon atoms and a long-chain organic group having 8 to 30 carbon atoms with degrees of substitution satisfying the following formulas:

$$2.0 \leq DS_{SH} \leq 2.7$$

$$0.003 \leq DS_{LO}$$

$$2.4 \leq DS_{SH} + DS_{LO} \leq 3$$

where $DS_{SH}$ represents the degree of substitution with the short-chain organic group, and $DS_{LO}$ represents the degree of substitution with the long-chain organic group;
the lubricant (B) is at least one selected from the group consisting of a urea compound (B1) having a urea group (—NH—C(=O)—NH—) and an acyclic aliphatic group having 6 to 33 carbon atoms, an amide compound (B2) having an amide group (—C(=O)—NH—) and an acyclic aliphatic group having 6 to 33 carbon atoms, a fatty acid metal salt (B3), and a silicone-based lubricant (B4); and
a content of the lubricant (B) is in a range of 0.1 to 10% by mass.

According to another aspect of the present invention, there is provided a molded body formed by using the above cellulose resin composition.

According to another aspect of the present invention, there is provided a product using the above molded body.

According to another aspect of the present invention, there is provided a method for producing a cellulose resin composition comprising a cellulose derivative (A) and a lubricant (B),
wherein the cellulose derivative (A) is a cellulose derivative obtained by substituting at least a part of hydrogen atoms of hydroxy groups of a cellulose with a short-chain organic group having 2 to 4 carbon atoms and a long-chain organic group having 8 to 30 carbon atoms including an acyclic aliphatic group having 7 carbon atoms or more,
the lubricant (B) comprises a urea compound (B1) having a urea group (—NH—C(=O)—NH—) and an acyclic aliphatic group having 7 carbon atoms or more carbons,
the production method comprises mixing a short-chain bonded cellulose derivative obtained by introducing an acyl group having 2 to 4 carbon atoms into a cellulose, an aliphatic isocyanate compound having an acyclic aliphatic group having 7 carbon atoms or more, water, and a reaction catalyst, and melt kneading to form the cellulose derivative (A), to which the long-chain organic group and the short-chain organic group are bonded, and the urea compound (B1).

Advantageous Effects of Invention

According to exemplary embodiments of the present invention, it is possible to provide a cellulose resin composition capable of forming a molded body having a high-quality appearance and scratch resistance, a molded body formed by using the resin composition, and a product using the molded body.

DESCRIPTION OF EMBODIMENTS

The cellulose resin composition according to the exemplary embodiment of the present invention includes a cellulose derivative (A) exhibiting good thermoplasticity by substituting hydrogen atoms of hydroxyl groups of cellulose with a short-chain organic group and a long-chain organic group, and a lubricant (B). By using this cellulose resin composition, friction on the surface of a molded body can be reduced, and scratch resistance can be improved. Furthermore, it is possible to obtain a molded body which is excellent in water resistance and strength (elastic modulus and impact strength). Such a cellulose resin composition can be used for durable products such as electronic devices and automobiles.

The lubricant (B) is preferably at least one selected from the group consisting of a urea compound (B1) having a urea group (—NH—C(=O)—NH—) and an acyclic aliphatic group having 6 to 33 carbon atoms, an amide compound (B2) having an amide group (—C(=O)—NH—) and an acyclic aliphatic group having 6 to 33 carbon atoms, a fatty acid metal salt (B3), and a silicone-based lubricant (B4).

The content of the lubricant (B) can be set in the range of 0.1 to 10% by mass, preferably in the range of 0.5 to 10% by mass, more preferably in the range of 0.8 to 10% by mass, and preferably in the range of 1.5 to 10% by mass depending on the type of lubricant. The content of the lubricant (B) is preferably 0.5% by mass or more, more preferably 0.8% by mass or more, more preferably 1% by mass or more, and still more preferably 2% by mass or more from the viewpoint of sufficiently obtaining the scratch resistance (friction resistance) by the lubricant (B). The content of the lubricant (B) is preferably 10% by mass or less, more preferably 8% by mass or less, and still more preferably 6% by mass or less from the viewpoint of suppressing bleed out or suppressing turbidity (cloudiness in the case of a black molded body) to maintain a high-quality appearance.

In particular, the content of the urea compound (B1) is preferably 1% by mass or more, more preferably 1.5% by mass or more, and still more preferably 2.0% by mass or more. The content of the lubricant (B) is preferably 10% by mass or less, more preferably 8% by mass or less, and still more preferably 6% by mass or less, from the viewpoint of suppressing bleed out or suppressing turbidity (cloudiness in the case of a black molded body) to maintain a high-quality appearance.

Also, the content of the amide compound (B2) is preferably 1.5% by mass or more, more preferably 2% by mass or more, and still more preferably 2.5% by mass or more, from the viewpoint of more sufficiently obtaining scratch resistance (friction resistance); and the content of the lubricant (B) is preferably 10% by mass or less, more preferably 8% by mass or less, and still more preferably 6% by mass or less, from the viewpoint of suppressing bleed out or suppressing turbidity (cloudiness in the case of a black molded body) to maintain a high-quality appearance.

Furthermore, the content of the fatty acid metal salt (B3) is preferably 0.5% by mass or more, more preferably 0.8% by mass or more, more preferably 1.5% by mass or more, still more preferably more than 2% by mass or more, and particularly preferably 2.5% by mass or more, from the viewpoint of more sufficiently obtaining scratch resistance (friction resistance); and the content of the lubricant (B) is preferably 10% by mass or less, more preferably 8% by mass or less, and still more preferably 6% by mass or less, from the viewpoint of suppressing bleed out or suppressing turbidity (cloudiness in the case of a black molded body) to maintain a high-quality appearance.

In addition, the content of the silicone-based lubricant (B4) is preferably 1.5% by mass or more, more preferably 2.5% by mass or more, still more preferably 3% by mass or more, and particularly preferably 4% by mass or more, from the viewpoint of more sufficiently obtaining scratch resistance (friction resistance); and the content of the lubricant (B) is preferably 10% by mass or less, and more preferably 8% by mass or less, from the viewpoint of suppressing bleed out and maintaining a high-quality appearance.

The content of the lubricant (B) in the cellulose resin composition can be a content with respect to the cellulose derivative (A), which is an essential component, or when other components are included, the content of the lubricant (B) with respect to the cellulose resin composition is preferable.

By using the cellulose resin composition according to the present exemplary embodiment, a molded body having a high-quality appearance and scratch resistance can be obtained. The higher the glossiness of the molded body, the higher the appearance quality can be obtained. When a black colorant is included, the lower the brightness, the higher the jet-blackness can be obtained, and accordingly the higher the appearance quality can be obtained.

The fatty acid metal salt preferably has a high melting point from the viewpoint of suppressing bleed-out from the surface of the molded body to obtain a high-quality appearance. Accordingly, the melting point of the fatty acid metal salt is preferably 100° C. or more. In addition, it is preferable that the melting point of the lubricant (B) is lower than the kneading temperature and the molding temperature from the viewpoint of easiness of melt mixing at the time of manufacturing the cellulose resin composition and moldability. Therefore, the melting point of the fatty acid metal salt is preferably 200° C. or less, more preferably 180° C. or less, and still more preferably 170° C. or less. As such a fatty acid metal salt, for example, a metal salt (for example, a calcium salt) of a long-chain fatty acid having 12 or more carbon atoms is mentioned, and calcium stearate (calcium bis-stearate) is preferable.

The cellulose derivative (A) is preferably a cellulose derivative in which at least a part of hydrogen atoms of hydroxy groups of cellulose is substituted with a short-chain organic group having 2 to 4 carbon atoms and a long-chain organic group having 8 to 30 carbon atoms. The short-chain organic group is at least one acyl group selected from acyl groups having 2 to 4 carbon atoms (acetyl group, propionyl group, butyryl group), and acetyl group or/and propionyl group are preferable. The long-chain organic group is preferably a group represented by (L1) or (L2) (in the formulas, R represents an organic group).

$$R-C(=O)- \qquad (L1)$$

$$R-NHC(=O)- \qquad (L2)$$

The cellulose resin composition according to the present exemplary embodiment may further include a colorant, and preferably includes a black colorant. As the black colorant, carbon black is preferable. The molded body obtained using the cellulose resin composition according to the present exemplary embodiment including the black colorant has a high glossiness and a low brightness (high jet-blackness) and can have a high quality appearance.

Hereinafter, preferred exemplary embodiments of the present invention will be described.

(Cellulose Derivative (A))

As the cellulose derivative (A) included in the cellulose resin composition according to the exemplary embodiment of the present invention, a cellulose derivative in which a short-chain organic group having 2 to 4 carbon atoms and a long-chain organic group having 8 to 30 carbon atoms are introduced into at least a part of hydroxy groups of cellulose used as a raw material can be used.

<Cellulose>

Cellulose is a straight-chain polymer obtained by polymerizing β-D-glucose molecules (β-D-glucopyranose) represented by the following formula (1) via β (1→4) glycoside bond. Each of glucose units constituting cellulose has three hydroxy groups (in the formula, n represents a natural number). In an exemplary embodiment of the present invention, a short-chain organic group having 2 to 4 carbon atoms and a long-chain organic group having 8 to 30 carbon atoms are introduced into such cellulose by using these hydroxy groups.

[Formula 1]

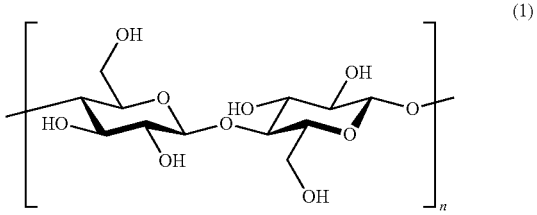

Cellulose is a main component of a plant and can be obtained by a separation treatment for removing other components such as lignin from a plant. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

The polymerization degree of a cellulose in terms of polymerization degree (average polymerization degree) of glucose preferably falls within the range of 50 to 5000, more preferably 100 to 3000 and further preferably 100 to 3000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

The cellulose may be mixed with chitin or chitosan having a similar structure, and when mixed, the content thereof is preferably 30% by mass or less, preferably 20% by mass or less, and more preferably 10% by mass or less with respect to the entire mixture.

<Cellulose Derivative>

In an exemplary embodiment of the present invention, a cellulose derivative in which at least a part of hydrogen atoms of hydroxy groups of the above cellulose is substituted with a short-chain organic group having 2 to 4 carbon atoms (preferably at least one of acetyl group, propionyl group, and butyryl group) and a long-chain organic group having 8 to 30 carbon atoms with degrees of substitution satisfying the following formulas can be used.

$2.0 \leq DS_{SH} \leq 2.7$ $0.003 \leq DS_{LO}$ $2.4 \leq DS_{SH} + DS_{LO} \leq 3$ ($DS_{SH}$ represents the degree of substitution with the short-chain organic group, and $DS_{LO}$ represents the degree of substitution with the long-chain organic group)

As the long-chain organic group having 8 to 30 carbon atoms, a group represented by the following formula (L1) or (L2) is preferable (R in the formulas represents an organic group).

R—C(=O)—    (L1)

R—NHC(=O)—    (L2)

Examples of the organic group R in the formulas include an acyclic aliphatic group. For example, long-chain organic groups represented by the above formulas include $C_nH_{2n+1}C(=O)-$, and $C_nH_{2n+1}NHC(=O)-$, where n is an integer of 7 to 29.

<Short-Chain Organic Group>

The short-chain organic group is an acyl group having 2 to 4 carbon atoms, including acetyl group, propionyl group, butyryl group, isobutyryl group, and an acyl group having 2 or 3 carbon atoms (acetyl group, propionyl group) is preferable. One or more of these acyl groups can be introduced into the cellulose.

The hydroxy groups in cellulose can be reacted with a short chain reactant including an aliphatic monocarboxylic acid such as acetic acid, propionic acid, butanoic acid, isobutyric acid, an acid anhydride such as acetic anhydride, propionic anhydride, butyric anhydride, isobutyric anhydride, or an acid halide such as acetyl chloride, propionyl chloride, butyryl chloride, isobutyryl chloride to introduce the short chain organic group.

The degree of substitution of the short-chain organic group per glucose unit of cellulose ($DS_{SH}$) (average value), that is, the number of hydroxyl groups substituted with the short-chain organic group (hydroxyl group substitution degree) (average value) is 2.0 or more, preferably 2.2 or more, and more preferably 2.4 or more from the viewpoint of adjusting the interaction of the cellulose molecular chains each other and obtaining a higher elastic modulus. From the viewpoint of sufficiently securing the degree of substitution of the long-chain organic group ($DS_{LO}$), it is preferable that $DS_{SH}$ be 2.7 or less.

The degree of substitution of the short-chain organic group ($DS_{SH}$) and the degree of substitution of the long-chain organic group ($DS_{LO}$) of the cellulose derivative can be measured by $^1$H-NMR using deuterated chloroform ($CDCl_3$) as solvent. In cellulose derivatives which are insoluble in $CDCl_3$, the residual hydroxyl groups of the cellulose derivatives can be further acetylated or propionylated before measurement.

<Long Chain Organic Group>

The long-chain organic group can be introduced by reacting a hydroxy group of cellulose with a long-chain reactant. This long-chain organic group corresponds to a organic group portion introduced in place of the hydrogen atom of the hydroxy group of the cellulose.

The long chain reactant is a compound having at least one functional group capable of reacting with a hydroxy group of cellulose, for example, a hydrocarbon compound having a carboxyl group, a carboxylic acid halide group, a carboxylic anhydride group, an isocyanate group, a chloroformate group, or an acryloyl group, and a compound having a carboxylic acid halide group, a carboxylic anhydride group, or an isocyanate group is particularly preferable. Specific examples include aliphatic monocarboxylic acids, their acid halides or their acid anhydrides, aliphatic monoisocyanates, aliphatic monochloroformates, acrylic acid esters, and methacrylic acid esters; and aliphatic monocarboxylic acid halides, aliphatic carboxylic anhydrides, and aliphatic monoisocyanates are preferable.

The long chain organic group has a carbon number in the range of 8 to 30, and a carbon number in the range of 12 to 30 is preferable because a thermoplastic effect can be obtained by a small amount, and 12 to 24 is more preferable. The long chain organic group may be one or two or more kinds may be introduced (substituted). Aliphatic monocarboxylic acids for the long chain reactants include linear or branched (having a side-chain) fatty acids. The fatty acids include saturated fatty acids and unsaturated fatty acids, but from the viewpoint of thermal stability, saturated fatty acids are preferable. More preferably, the long chain reactant is an acid halide of such a fatty acid or an anhydride thereof. Suitable long chain fatty acids for the long chain reactants include linear saturated fatty acids such as lauric acid, myristic acid, pentadecyl acid, palmitic acid, malgalic acid, stearic acid, arachidic acid, behenic acid, lignoseric acid, serotic acid, montanic acid, melicic acid, and the like, or include myristic acid, palmitic acid, stearic acid, arachidic acid, behenic acid, acid, and halides or anhydrides of these long chain fatty acids. Aliphatic monoisocyanates include straight or branched (having a side-chain) aliphatic hydrocarbons with isocyanate groups attached to them. Examples include octyl isocyanate, dodecyl isocyanate, octadecyl isocyanate, and the like.

Aliphatic monochloroformates include straight or branched (having a side-chain) aliphatic hydrocarbons with chloroformate groups attached to them.

The degree of substitution of the long-chain organic group per glucose unit of cellulose ($DS_{LO}$) (average value), that is, the number of hydroxyl groups substituted with the long-chain organic group (hydroxyl group substitution degree) (average value) is preferably 0.003 or more, more preferably 0.02 or more, still more preferably 0.03 or more, and particularly preferably 0.07 or more from the viewpoint of improving thermoplasticity and water resistance. In addition, from the standpoint of mechanical strength such as elastic modulus, $DS_{LO}$ is preferably less than 1, more preferably less than 0.5, and still more preferably 0.4 or less.

The sum of the degree of substitution $DS_{SH}$ of the short-chain organic group and the degree of substitution $DS_{LO}$ of the long-chain organic group is preferably 2.4 or more, and more preferably 2.5 or more, from the viewpoint of sufficiently obtaining the effects of introducing these organic groups (thermoplasticity and mechanical strength). In addition, "3" in which all hydroxy groups of cellulose are substituted may be used, but less than 3 is preferable, 2.9 or less is more preferable, and 2.8 or less is still more preferable from the viewpoint of productivity and mechanical properties. The degrees of substitution of the short-chain organic group and the long-chain organic group can be appropriately set depending on the structures of the organic groups and the physical properties required for the cellulose derivative.

<Molecular Weight of Cellulose Derivatives>

The lower limit of the number average molecular weight (Mn) of the cellulose derivative of the present invention is, for example, preferably 10,000 or more, more preferably 20,000 or more, and still more preferably 50,000 or more. The upper limit is, for example, preferably 200,000 or less, more preferably 100,000 or less. The lower limit of the weight average molecular weight (Mw) is, for example, preferably 50,000 or more, more preferably 100,000 or more, and the upper limit is, for example, preferably 300,000 or less, more preferably 200,000 or less. The lower limit of the molecular weight distribution (Mw/Mn) is, for example, preferably 1.1 or more, more preferably 1.4 or more, and the upper limit is, for example, preferably 4.0 or less, more preferably 3.5 or less. By setting the number average molecular weight, weight average molecular weight, and molecular weight distribution in these ranges, strength, thermoplasticity, moldability, and the like are improved. Molecular weights can be measured (calibrated with polystyrene standards) by gel permeation chromatography (GPC) using, for example, chloroform as solvent. In cellulose derivatives insoluble in chloroform, the residual hydroxyl groups of the cellulose derivatives can be further acetylated or propionylated before measurement.

(Lubricant (B))

When urea compound (B1) and amide compound (B2) (e.g., monoamide compound (B2a) or bisamide compound (B2b)) are contained in the cellulose derivative of the present invention as the lubricant (B), the frictional force on the surface of the molded body is reduced, and the scratch resistance of the molded body using the cellulose derivative is improved.

<Urea Compound (B1)>

Urea compound (B1) has a urea group (—NH—C(=O)—NH—) and an acyclic aliphatic group having 6-33 carbon atoms. The urea compound (B1) is preferably a compound (B1) having a urea group (—NH—C(=O)—NH—) and a saturated aliphatic hydrocarbon group having 6 to 33 carbon atoms, represented by the following formula (N1).

[Formula 2]

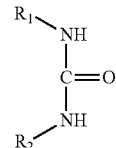

(N1)

$R_1 = C_nH_{2n+1}, R_2 = C_mH_{2m+1}$

The n and m of R1 and R2 are in the range of 6 to 33, preferably 7 to 29, and preferably 12 to 29. The values of n and m may be different or the same. From the viewpoint that the affinity with the cellulose derivative is good and breedout of the urea compound is suppressed, n and m are preferably in the range of (the carbon number of the long-chain organic group of the cellulose derivative −3) to (the carbon number of the long-chain organic group of the cellulose derivative +3).

The content of urea compound (B1) is preferably in the range of 1% to 10% by mass, more preferably in the range of 1.5% to 10% by mass, and still more preferably in the range of 2.0% to 10% by mass. If the content of the urea compound (B1) is too small, the scratch resistance of the molded body using the cellulose resin composition is not sufficiently improved. If the content of the urea compound (B1) is too large, the urea compound tends to bleed out from the surface of the molded body or causes turbidity (cloudiness in the case of a black molded body), which may impair the appearance of the molded body.

The urea compound (B1) can be prepared as follows.

An aliphatic monoisocyanate having an aliphatic group having 6 to 33 carbon atoms is reacted with water to form an aliphatic monoamine having an aliphatic group having 6 to 33 carbon atoms, and the aliphatic monoamine is reacted with the aliphatic monoisocyanate to prepare a urea compound (B1).

Alternatively, the urea compound (B1) can be prepared by reacting an aliphatic monoisocyanate having aliphatic groups having 6 to 33 carbon atoms with an aliphatic monoamine having aliphatic groups having 6 to 33 carbon atoms.

The aliphatic monoisocyanates and the aliphatic monoamines have straight or branched (having a side-chain) aliphatic groups. Examples of the above aliphatic monosolenocyanates include hexyl isocyanate, octyl isocyanate, decyl isocyanate, octadecyl isocyanate, and the like.

Examples of the aliphatic monoamines include hexylamine, octylamine, dodecylamine, stearylamine, and the like.

In the synthesis of the urea compound, for example, by adding an appropriate amount of water to an aliphatic monoisocyanate dissolved in a solvent, an amine is generated by a reaction between the aliphatic isocyanate and water, and further, a reaction between the aliphatic isocyanate and the generated amine occurs, whereby the urea compound is obtained.

When introducing a long-chain organic group by reacting a hydroxy group of cellulose with an aliphatic monoisocyanate, if moisture is present in the reaction system, the aliphatic monoisocyanate also reacts with moisture (e.g., moisture in cellulose) in addition to the hydroxy group in cellulose to form an amine, and further a reaction between the aliphatic monoisocyanate and the formed amine occurs to form a urea compound. Accordingly, in a production of the cellulose derivative including the step of introducing the long-chain organic group using the aliphatic monoisocyanate, the urea compound is also produced simultaneously with the introduction of the long-chain organic group, and is included in the cellulose derivative. Therefore, in the production of the cellulose resin composition containing the cellulose derivative (A) and the lubricant (B), the step of adding the lubricant (B) can be omitted, and the production process can be simplified. The content of the urea compound can be adjusted by controlling the amount of water in the cellulose. The temperature of melt kneading the cellulose including the hydroxy group together with the aliphatic monoisocyanate is preferably not less than 170° C. and not more than 210° C. When the temperature is 170° C. or more, sufficient melt kneading becomes possible, and when the temperature is 210° C. or less, the urethane bond is hardly dissociated by heat, which is preferable.

As a reaction catalyst used for the reaction for producing the urea compound, a commonly used urethanization catalyst can be used, and a tin catalyst, a titanium catalyst, or a zirconium catalyst can be used. Known catalysts include organotin compounds such as tin octanoate, tin 2-ethyl-1-hexanoate, tin ethylcaproate, tin laurate, tin palmitate, dibutyltin oxide, dibutyltin dichloride, dibutyltin diacetate, dibutyltin dimalate, dibutyltin dilaurate, dioctyltin diacetate, dioctyltin dilaurate; orgagnotitanium compounds such as tetraisopropyl titanate, tetranormalbutyl titanate, tetraoctyl titanate, titanium ethyl acetoacetate; and orggnozirconium compounds such as zirconium tetraacetylacetonate, zirconium ethyl acetoacetate. The addition amount of the reaction catalyst is preferably 0.05 wt % or more and 5 wt % or less, preferably 0.1 wt % or more and 3 wt % or less with respect to the cellulose resin.

The process for the formation of an example of the urea compound described above (where n=m=18) is illustrated by the following chemical reaction formulas.

[Formula 3]

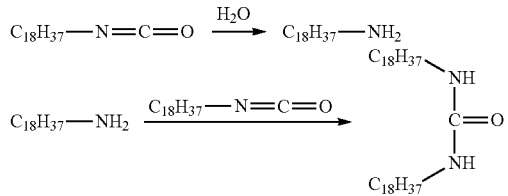

<Amide Compound (B2)>

The amide compound (B2) has an amide group (—C(=O)—NH—) and an acyclic aliphatic group having 6 to 33 carbon atoms. As the amide compound (B2), a monoamide compound (B2a) represented by formula (N2) and a bisamide compound (B2b) represented by formula (N3) are preferable.

[Formula 4]

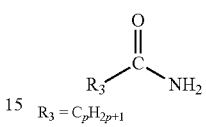

$R_3 = C_pH_{2p+1}$

[Formula 5]

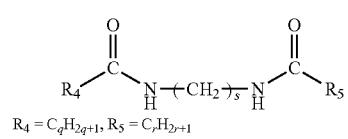

$R_4 = C_qH_{2q+1}, R_5 = C_rH_{2r+1}$ $R_3$, $R_4$, and $R_5$ are each a saturated aliphatic hydrocarbon group, and p, q, and r are integers from 6 to 33 for $R_3$, $R_4$, and $R_5$, and integers from 9 to 30 are preferable. $R_3$, $R_4$, and $R_5$ may be straight-chain or branched. In formula (N3), $1 \leq s \leq 6$, and q and r may be different or the same. From the viewpoint that the affinity with the cellulose derivative is good and bleed-out of the amide compound or the bisamide compound is suppressed, p, q, and r are preferably in the range of (the carbon number of the long-chain organic group of the cellulose derivative −3) to (the carbon number of the long-chain organic group of the cellulose derivative +3).

The content of the amide compound (B2) is preferably in the range of 1.5 to 10% by mass. In particular, the content of the monoamide compound (B2a) is preferably in the range of 2.0 to 10% by mass, and more preferably in the range of 2.5 to 10% by mass. The content of the bisamide compound (B2b) is more preferably in the range of 2.5 to 10% by mass, still more preferably in the range of 4 to 10% by mass, and can be preferably set in the range of 5 to 10% by mass. If the content of the amide compound (B2) is too small, the scratch resistance of the molded body using the cellulose resin composition is not sufficiently improved. If the content of the amide compound (B2) is excessively large, the amide compound (B2) tends to bleed out from the surface of the molded body or causes turbidity (cloudiness in the case of a black molded body), which may impair the appearance of the molded body. The monoamide compound (B2a) or the bisamide compound (B2b) may be used alone or mixed.

Examples of the monoamide compound (B2a) include lauric acid amide (dodecanamide), palmitic acid amide (hexadecanamide), stearic acid amide (stearamied), behenic acid amide (docosanamide), and the like. Examples of the bisamide compound (B2b) include methylene bis behenic acid amide, methylene bis stearamide, methylene bis oleamide, ethylene bis stearamide, hexamethylene bis stearamide, hexamethylene bis oleamide, and the like.

<Fatty Acid Metal Salt (Metal Soap) (B3)>

Examples of the fatty acid metal salt (metal soap) (B3) include compounds of higher fatty acids having 12 or more carbon atoms such as stearic acid, behenic acid, lauric acid, succinic acid, hydroxystearic acid, ricinoleic acid, oleic acid, palmitic acid, and erucic acid, and the like, with metals such as Li, Na, Mg, Ca, Sr, Ba, Zn, Cd, Al, Sn, Pb, Cd, and the like. As the fatty acid metal salt (metal soap) (B3), at least one selected from the group consisting of calcium stearate, zinc stearate, magnesium stearate, aluminum monostearate, aluminum distearate, aluminum tristearate, and zinc laurate is preferable. A particularly preferable fatty acid metal salt lubricant (metal soap) includes calcium stearate or the like.

The content of the fatty acid metal salt (metal soap) (B3) is preferably in the range of 0.5 to 10% by mass, more preferably in the range of 0.8 to 10% by mass, more preferably in the range of 1.5 to 10% by mass, still more preferably in the range of 2.0 to 10% by mass, and particularly preferably in the range of 2.5 to 10% by mass. If the content of the fatty acid metal salt (metal soap) (B3) is too small, the scratch resistance of the molded body using the cellulose resin composition is not sufficiently improved. If the content of the fatty acid metal salt (metal soap) (B3) is excessively large, the fatty acid metal salt (metal soap) (B3) tends to bleed out from the surface of the molded body or causes turbidity (cloudiness in the case of a black molded body), which may impair the appearance of the molded body.

<Silicone-Based Lubricant (B4)>

Examples of the silicone-based lubricants (B4) include dimethylpolysiloxane and its modified properties, carboxyl-modified silicone, α-methylstyrene-modified silicone, α-olefin-modified silicone, polyether-modified silicone, fluorine-modified silicone, hydrophilic-special-modified silicone, olefin-polyether-modified silicone, epoxy-modified silicone, amino-modified silicone, amide-modified silicone, alcohol-modified silicone, and the like.

In the silicone-based lubricants (B4), polyorganosiloxane is preferable. The polyorganosiloxane has a siloxane bond as a main chain and an organic group in a side chain, and examples of the organic group include a methyl group, a vinyl group, an ethyl group, a propyl group, and a phenyl group, and polydimethylsiloxane is particularly preferable. The polyorganosiloxane is preferably ultra high molecular weight polydimethylsiloxane, and the number average molecular weight thereof is preferably 40000 or more, more preferably 100000 or more, and particularly preferably 1000000 or more. This number average molecular weight measurement can be determined by gel permeation chromatography (GPC) (standard polystyrene commercially available as a standard sample can be used).

The silicone-based lubricants (B4) preferably further contain inorganic oxide particles in addition to silicone such as polyorganosiloxane, and in particular, it is preferable to impregnate the inorganic oxide particles with the silicone. By impregnating the inorganic oxide particles with the silicone, the silicone is easily fixed in the resin and is less likely to bleed out. Examples of the inorganic oxide particles include silica ($SiO_2$), SiO, aluminosilicate, and $MgSiO_3$. In light of compatibility with the silicone, silica is preferable, and fumed silica is particularly preferable. The ratio of the silicone to inorganic oxide particles is preferably from 60:40 to 80:20, more preferably from 60:40 to 70:30. Specific examples of such a silicone-based lubricant include "Genioplast® Pellet S" (product name) manufactured by Wacker Asahi Kasei Silicone Co., Ltd., and the like.

The content of the silicone-based lubricant (B4) is preferably in the range of 1.5 to 10% by mass, more preferably in the range of 2.5 to 10% by mass, more preferably in the range of 3.0 to 10% by mass, more preferably in the range of 4 to 10% by mass, and still more preferably in the range of 5 to 10% by mass. If the content of the silicone-based lubricant (B4) is too small, the scratch resistance of the molded body using the cellulose resin composition is not sufficiently improved. If the content of the silicone-based lubricant (B4) is excessively large, the silicone-based lubricant (B4) tends to bleed out from the surface of the molded body or causes turbidity (cloudiness in the case of a black molded body), which may impair the appearance of the molded body.

(Method for Producing Cellulose Derivatives)

The cellulose derivative used in the exemplary embodiment of the present invention can be produced, for example, by the following production method. In the following, an example of the production method in the case where the long-chain organic group is a long-chain acyl group, in particular, in the case of a long-chain aliphatic acyl group is mentioned, but even in the case where the long-chain organic group is bonded by another bonding mode, the following production method can be utilized by appropriately changing.

<Activation of Cellulose>

Before the reaction step for introducing a long-chain organic group, or a long-chain organic group together with a short-chain organic group into a cellulose, an activation treatment (pretreatment step) can be performed in order to increase the reactivity of the cellulose. As the activation treatment, an activation treatment which is routinely performed before acetylation of a cellulose can be applied.

In the activation treatment, a cellulose is swollen by bringing the cellulose into contact with a solvent, for example, by a method of spraying an activation solvent having affinity for a cellulose to the cellulose or by a method (soaking method) of soaking a cellulose in an activation solvent. Owing to the treatment, a reactant easily penetrates between cellulose molecular chains (if a solvent and a catalyst are used, a reactant easily penetrates together with these), with the result that the reactivity of the cellulose improves. Herein, examples of the activation solvent include water; carboxylic acids such as acetic acid, propionic acid, butyric acid, valeric acid, caproic acid, enanthic acid, caprylic acid, pelargonic acid and stearic acid; alcohols such as methanol, ethanol, propanol and isopropanol; nitrogen-containing compounds such as dimethylformamide, formamide, ethanolamine and pyridine; and sulfoxide compounds such as dimethylsulfoxide. These can be used singly or in combination of two or more types. Particularly preferably, water, acetic acid, pyridine and dimethylsulfoxide can be used.

A cellulose can be activated by putting it in a long-chain fatty acid. If the melting point of the long-chain fatty acid is room temperature or more, a cellulose can be heated up to the melting point or more.

The use amount of activation solvent relative to a cellulose (100 parts by mass) can be set to be, for example, 10 parts by mass or more, preferably 20 parts by mass or more and more preferably 30 parts by mass or more. If a cellulose is soaked in an activation solvent, the use amount of activation solvent relative to the cellulose in term of mass, can be set to be, for example, the same or more, preferably 5 times or more and more preferably 10 times or more. In view of load for removing an activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

When a cellulose is put in a melted long-chain fatty acid, the cellulose can be heated up to melting point or more of the long-chain fatty acid.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration, filter press and compression.

The activation solvent contained in the cellulose can be substituted with the solvent to be used in the reaction after the activation treatment. For example, a substitution treatment can be performed in accordance with the soaking method for an activation treatment mentioned above by changing the activation solvent to the solvent to be used in the reaction.

<Methods for Introducing Long-Chain Organic Groups and Short-Chain Organic Groups>

A process for producing a cellulose derivative according to an exemplary embodiment includes, for example, a step of acylating hydroxy groups of a cellulose by reacting, in an organic solvent, the cellulose dispersed in the organic solvent, a short-chain acylating agent and a long-chain acylating agent in the presence of an acid trapping component while warming. It is preferable that the short-chain acylating agent and the long-chain acylating agent are dissolved in the solvent. The acid trapping component may be also used as a solvent.

When a long chain organic group of a linear saturated fatty acid is introduced into cellulose, the long chain acylating agent is preferably one selected from an acid chloride and an acid anhydride of the linear saturated fatty acid, and one kind may be used alone or two or more kinds may be used in combination. As a short chain reactant for introducing a short chain organic group into cellulose, one selected from acetyl chloride, acetic anhydride, propionyl chloride, and propionic anhydride is preferable, and one kind may be used alone or two or more kinds may be used in combination.

The addition amounts of the long-chain reactant and short-chain reactant can be set in accordance with the degree of substitution ($DS_{LO}$) with a long-chain organic group and the degree of substitution ($DS_{SH}$) with a short-chain organic group in a desired cellulose derivative. If the short-chain reactant is excessively present, the binding amount of a long-chain organic group decreases and the degree of substitution ($DS_{LO}$) with a long-chain organic group tends to decrease.

As the organic solvent, a solvent providing a liquid holding rate by cellulose: 90 vol % or more, is preferably used.

The "liquid holding rate" can be measured as follows.

Filter paper (5B, 40 mmφ, water content: about 2%) made of cotton fiber is soaked in each solvent at room temperature for one hour. The weights of the filter paper before and after soaking are measured and assigned to the following expression. In this manner, a liquid holding rate (vol %) is obtained. The weight of a sample after soaking is measured at the time when dripping of a solvent from the sample is stopped.

Liquid holding rate (vol %)=(weight after soaking−weight before soaking)/weight before soaking/specific gravity of solvent×100

Examples of a solvent providing a liquid holding rate of 90 vol % or more, include water (liquid holding rate: 145 vol %), acetic acid (liquid holding rate: 109 vol %), dioxane (liquid holding rate: 93 vol %), pyridine (liquid holding rate: 109 vol %), N-methyl pyrrolidone (liquid holding rate: 104 vol %), N,N-dimethylacetamide (liquid holding rate: 112 vol %), N,N-dimethylformamide (liquid holding rate: 129 vol %) and dimethylsulfoxide (liquid holding rate: 180 vol %).

An acid trapping component is not particularly limited as long as it is a base neutralizing an acid (e.g., hydrochloric acid, acetic acid, propionic acid) produced as a by-product. Examples thereof include alkaline metal hydroxides such as sodium hydroxide and potassium hydroxide; alkaline earth metal hydroxides such as calcium hydroxide and barium hydroxide; metal alkoxides such as sodium methoxide, sodium ethoxide; and nitrogen-containing nucleophilic compounds such as diazabicycloundecene, diazabicyclononene, triethylamine and pyridine. Of them, triethylamine and pyridine are preferable, and pyridine is particularly preferable since it can be used also as a solvent. When an acid trapping component is added independently of a solvent, it is preferable that the acid trapping component is present in a reaction system from the initiation time of a reaction. As long as an acid trapping component is present in a reaction system from the initiation time of a reaction, an acid trapping component may be added before or after addition of an acylating agent.

The addition amount of an acid trapping component relative to the total amount of a starting long-chain acylating agent and a starting short-chain acylating agent is preferably 0.1 to 10 equivalents and more preferably 0.5 to 5 equivalents. However, when a nitrogen-containing nucleophilic compound for the acid trapping component is used as a solvent, the addition amount of the acid trapping component is not limited the above range. If the addition amount of an acid trapping component is small, an acylation reaction efficiency decreases. In contrast, if the addition amount of an acid trapping component is large, the cellulose may be decomposed and sometimes reduced in molecular weight.

The reaction temperature in the acylation step is preferably 50 to 100° C. and more preferably 75 to 95° C. The reaction time can be set at 2 hours to 5 hours and preferably 3 hours to 4 hours. If the reaction temperature is sufficiently high, the reaction speed can be increased, with the result that an acylation reaction can be completed in a relative short time and the reaction efficiency can be increased. If the reaction temperature falls within the above range, a decrease in molecular weight by heating can be suppressed.

The amount of an organic solvent can be set to be 10 to 50 times and preferably 15 to 40 times (mass ratio) as large as the amount (dry mass) of the raw material cellulose.

<Recovery Process>

A cellulose derivative (product), which is formed by introducing a long-chain organic group and a short-chain organic group, can be recovered from a reaction solution in accordance with a recovery method generally used. The recovery method is not limited; however, if the product is not dissolved in a reaction solution, a solid-liquid separation method for separating the reaction solution and the product is preferable in view of production energy. If it is difficult to separate a solid and a liquid because the product is dissolved in or compatible with a reaction solution, the reaction solution is distilled off and the product can be recovered as the residue. Alternatively, the product may be recovered by adding a poor solvent for the product into the reaction solution to precipitate the product, and conducting solid-liquid separation.

When a reaction solution is distillated, it is preferable to use a short-chain reactant, a reaction solvent and a catalyst having low boiling points. The catalyst can be removed from a product with, e.g., a washing solvent without distillation. When components except a product, such as a solvent, are distilled away from a reaction solution, distillation is stopped when a product is precipitated, and then, the remaining reaction solution and the precipitated product can be subjected to solid-liquid separation to recovery the product.

As the solid-liquid separation method, e.g., filtration (natural filtration, filtration under reduced pressure, pressure filtration, centrifugal filtration and these while applying heat), spontaneous sedimentation and flotation, separation (by funnel), centrifugal separation and squeeze, are mentioned. These methods can be used appropriately in combination.

A product (a cellulose derivative) dissolved in a filtrate after the solid-liquid separation can be precipitated by adding a poor solvent for the product and further subjected to solid-liquid separation to recover it.

The solid content (a cellulose derivative) recovered from a reaction solution can be, if necessary, washed and dried by a method generally employed.

<Other Process for Producing Cellulose Derivative in Solid-Liquid Heterogeneous System>

A cellulose derivative can be obtained by acylating a cellulose in a solid-liquid heterogeneous system using a mixed acid anhydride containing a long-chain organic group and a short-chain organic group, as an acylating agent. Cellulose is preferably activated. The activation treatment can be performed by a method generally used.

Acylation can be carried out in a solvent which provides a liquid holding rate of 90% or more (for example, dioxane, in an amount of, e.g., 80 to 120 times as large as the dry weight of cellulose), in the presence of an acid catalyst (for example, sulfuric acid) while stirring at 45 to 65° C. for 2 to 5 hours. Thereafter, it is preferable that water is added to age the reaction solution for a few hours (for example, 1 to 3 hours) while heating (for example, 55 to 75° C.).

After completion of the reaction, a poor solvent such as a water/methanol solvent mixture, is added to allow a product dissolved in the liquid phase to sufficiently precipitate, and then, solid-liquid separation can be performed to recover a product. Thereafter, washing and drying can be made.

Acylation can be performed in a homogeneous solution system in which a cellulose and an acylating agent are homogenously dissolved in a solvent. A cellulose is preferably activated. The activation treatment can be performed by a method generally used.

As a solvent for the acylation, a solvent capable of dissolving cellulose such as N,N-dimethylacetamide can be used.

As the acylating agent, a mixed acid anhydride having a long-chain organic group and a short-chain organic group, which is produced in the same solvent as the solvent to be used in acylation, can be used.

After completion of the reaction, a poor solvent such as methanol is added to precipitate a product, which can be recovered by solid-liquid separation. Thereafter, washing and drying can be made.

<Method for Producing Cellulose Derivative in Solvent-Free System>

In preparations of the cellulose derivative, when a cellulose resin having a thermoplastic property, in which a short-chain organic group has already been introduced, such as CAP (cellulose acetate propionate) or CAB (cellulose acetate butyrate) is used as the cellulose-based raw material, the reaction between the hydroxy group of the cellulose resin and the long-chain reactant can be carried out without using a solvent. The long chain organic group can be introduced by melt-mixing CAP or CAB and the long chain reactant to react the hydroxy group with the long chain reactant, using a compounding apparatus such as a known mixer, a single-screw or multi-screw mixing extruder, a kneader, or the like. Among the long chain reactants, particularly in the case of using an aliphatic monoisocyanate, a urea compound is also formed in addition to the reaction of the hydroxy group and the isocyanate, so that the step of adding the urea compound as a lubricant can be omitted, and hence the manufacturing process is simplified. In addition, although CA (cellulose acetate) does not exhibit thermoplasticity, by kneading it with a long chain reactant while applying sharing load with a kneader, the long chain reactant also functions as a plasticizer, so that the reaction between the hydroxy group and the long chain reactant becomes possible, the long chain organic group can be introduced, and accordingly a thermoplastic cellulose derivative can be obtained.

(Other additives)
<Plasticizer>

In the cellulose resin composition according to the exemplary embodiment of the present invention, various additives used for ordinary thermoplastic resins can be used. For example, by adding a plasticizer, thermoplasticity and elongation at break can be further improved. In the case of using polymeric plasticizers, aliphatic polyesters are preferred. Examples of the aliphatic polyesters include polybutylene succinate, polybutylene succinate adipate, polycaprolactone, polyhydroxybutyrate and polyhydroxybutyrate hexanate, and polybutylene succinate is particularly preferable. Examples of low molecular weight plasticizers include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; phosphoric acid esters such as triethyl phosphate, triphenyl phosphate and tricresyl phosphate; epoxylated vegetable oils such as epoxylated soybean oil and epoxylated linseed oil; castor oil and a derivative thereof. Among these, particularly preferable are plasticizers such as dioctyl adipate, benzyl-2 butoxyethoxyethyl adipate, tricresyl phosphate, diphenyl cresyl phosphate, and diphenyloctyl phosphate.

When a plasticizer is added to the cellulose derivative of the present invention, the content thereof is preferably 1 to 40% by mass, more preferably 1 to 20% by mass, based on the whole of the cellulose derivative. When the plasticizing component has a low molecular weight, or when the cellulose derivative itself has plasticity and a desired plasticity can be easily obtained by adding a plasticizer, the content is more preferably 1 to 10% by mass.

<Colorant>

The cellulose resin composition according to the exemplary embodiment of the present invention may include a colorant such as a black colorant.

The content of the colorant such as the black colorant can be set to 0.01% by mass or more, and can be set in the range of 0.05 to 10% by mass. From the viewpoint of obtaining a sufficient coloring effect, the content of the black colorant is preferably 0.1% by mass or more, preferably 0.2% by mass or more, and more preferably 0.5% by mass or more. From the viewpoint of suppressing the excess amount of the black colorant while obtaining a sufficient coloring effect, the content is preferably 5% by mass or less, more preferably 3% by mass or less, still more preferably 2% by mass or less, and for example, 1% by mass or less can be set. The content of the colorant in the cellulose resin composition can be the content with respect to the cellulose derivative (A), which is an essential component, or when other components are included, it is preferable to be the content with respect to the cellulose resin composition.

As the black colorant, carbon black is preferable. The average particle size of the carbon black is preferably from 1 to 20 nm, more preferably from 5 to 20 nm, and still more preferably from 8 to 18 nm. The smaller the average particle diameter, the lower the brightness of the molded body, and accordingly the high appearance of black (jet black color) is likely to be obtained. Conversely, the larger the average particle diameter, the higher the dispersibility tends to be. From these viewpoints, it is preferable to use a carbon black having a particle diameter in the above range. The average particle diameter is an arithmetic average diameter of particles obtained by observing particles of carbon black with an electron microscope.

The specific surface area of the carbon black is preferably not less than 140 $m^2/g$, and more preferably not less than 180 $m^2/g$ from the viewpoint of jet blackness and the like of the molded product. From the viewpoint of dispersibility, the carbon black of 1000 $m^2/g$ or less can be used, the carbon black of 700 $m^2/g$ or less can be used, and the carbon black of 500 $m^2/g$ or less can be used. Relation between particle diameter and specific surface area, generally the smaller the particle diameter, the larger the specific surface area. From the viewpoint of the brightness and appearance of the molded product and the dispersibility of the particles, it is preferable to use carbon black having a BET specific surface area in the above range. This specific surface area is the BET specific surface area (JIS K6217) obtained by S-BET equation from the nitrogen-adsorbed amount.

Further, the carbon black is preferably acidic, specifically preferably has pH5 or less, more preferably pH4 or less, and still more preferably pH3.5 or less. By using such an acidic carbon black (having a low pH value), the brightness of the molded body can be lowered. For example, carbon blacks of preferably pH2.5 to 4, more preferably pH2.5 to 3.5 can be suitably used.

The pH value is obtained by measuring a mixed solution of carbon black and distilled water by a glass-electrode pH meter and specifically, measured in accordance with the following method. A pure water (100 ml) boiled and degassed is added to a sample (10 g). The mixture is boiled on a hot plate for 15 minutes and cooled to room temperature. Thereafter, the supernatant is removed and pH of the resultant muddy substance is measured by a glass-electrode pH meter.

Due to interaction or binding of an acidic group (for example, carboxylic acid group) on the surface of such acidic carbon black and a polar group (for example, hydroxy group) of a cellulose resin, affinity thereof is improved and high dispersion of carbon black occurs, which presumably contributes to reduction in brightness.

As colorants other than the black colorant, organic or inorganic pigments or dyes can be used, and concretely, iron (III) oxide, chromium (III) oxide, and the like can be mentioned.

By using the cellulose resin composition according to the present exemplary embodiment, a molded body having a high-quality appearance and scratch resistance can be formed. The higher the glossiness of the molded body and the lower the brightness thereof, the higher the appearance quality can be obtained. At this time, the lower the brightness, the higher the jet-blackness can be obtained.

<Filler>

To the cellulose composition according to an exemplary embodiment of the present invention, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

Other components may include additives usually used in common resin materials for molding, particularly additives usually used in common cellulose resins. Such additives include, for example, antioxidants such as phenol-based compound and phosphorous compound, colorants, light stabilizers, ultraviolet absorbers, antistatic agents, antimicrobial/antifungal agents, flame retardants, and the like.

(Method for Producing a Cellulose Resin Composition)

A method for producing the cellulose resin composition according to the exemplary embodiment of the present invention is not particularly limited, and for example, the cellulose resin composition can be obtained by melting and mixing a cellulose derivative (A) and a lubricant (B), and, if necessary, other additives by hand mixing or a conventional mixer. As the mixer, for example, a tumbler mixer, a ribbon blender, a single screw and a multi-screw extruder, a kneader or a compounding apparatus such as a kneading roll, can be used. After the melt-mixing, if necessary, granulation into an appropriate shape can be carried out; for example, pellets can be formed by a pelletizer. As another suitable preparation method, there is a method in which a cellulose derivative and a lubricant, and if necessary, various additives are dispersed in a solvent such as an organic solvent, and mixed, and if required, a coagulating solvent is further added to obtain a mixed composition of various additives and the resin, and then the solvent is evaporated.

(Molded Body)

The molded body formed using the cellulose resin composition according to the exemplary embodiment of the present invention can be formed into a desired shape by a usual molding method, and the shape is not limited and the thickness of the molded body is not limited. From the viewpoint of the strength of the molded body, the thickness is preferably 0.5 mm or more, and more preferably 0.8 mm or more. However, in the case of manufacturing a film or the like by hot press molding or the like, the thickness is preferable to be 0.1 mm or more, and the thickness may be 0.3 mm or more. Also, the upper limit of the thickness of the molded body is not particularly limited and can be appropriately set depending on a desired e.g., shape and strength. Even if the thickness is set, for example, 10 mm or less and further 5 mm or less, high external-appearance quality as well as sufficient mechanical strength can be obtained.

Since the carbon black is distributed over the entire molded body (all directions including thickness direction), a molded body having a desired shape and high external-appearance quality can be obtained even if e.g., coating or a decorative film is not applied.

The cellulose resin composition according to the exemplary embodiment of the present invention can be formed into a molded body in accordance with an intended use by a common molding method such as injection molding, injection compression molding, injection blow molding, extrusion molding, blow molding, or the like.

Since the molded body formed of the cellulose resin composition according to the exemplary embodiment of the present invention has high external-appearance quality and excellent mechanical characteristics, the molded body can be applied to a housing, an exterior package, a decorative plate, and a decorative film, and can be used in place of, for example, members used in electronic devices, home appliances, various containers, building materials, furniture, writing materials, automobiles and household articles. The molded body can be used in, for example, housing and exterior parts of electronic devices or home appliances, various storage cases, dishes, interior members of building materials, interior materials of automobiles and other daily necessities.

According to the exemplary embodiment of the present invention, it is possible to provide products containing a molded body formed of the resin composition of the present invention, such as electronic devices or home appliances, automobiles, building materials, furniture, writing materials and household articles.

Examples of use for electronic devices or home appliances include housing for personal computers, fixed phones, mobile phone terminals, smart phones, tablets, POS terminals, routers, projectors, speakers, lighting fixtures, calculators, remote controllers, refrigerators, washing machines, humidifiers, dehumidifiers, video recorders/players, vacuum cleaners, air conditioners, rice cookers, electric shavers, electric toothbrushes, dishwashers, and broadcast equipment; and cases for mobile terminals such as smart phones.

Examples of use for automobiles include interior parts such as instrument panels, dashboards, cup holders, door trims, armrests, door handles, door locks, handles, brake levers, ventilators and shift levers.

Examples of use for building materials include interior members such as wall materials, tiles, floor materials, window frames and doorknobs.

Examples of use for furniture include packaging of drawers, bookshelves, tables and chairs.

Examples of use for writing materials include packaging of pens, pen cases, book covers, scissors, and cutters.

Examples of use for daily necessities include glass frames, containers for cosmetics, cosmetic boxes for commodities, main bodies of jewelries or exterior packages therefor, decorative parts for clothing such as buttons, exterior packages for earphones, main bodies of cards or exterior packages therefor, and business card dishes.

In addition, for example, as a sports-related article, a golf tee or a golf marker can be mentioned.

EXAMPLES

Hereinafter, the present invention will be described in more detail with reference to specific examples.

The constituent materials used in the Examples and Comparative Examples are as follows.

Cellulose derivative (A): cellulose derivative (C1) obtained in Synthesis Example 1, cellulose derivative (C2) obtained in Synthesis Example 2, cellulose derivative (C3) obtained in Synthesis Example 3, cellulose derivative (C4) obtained in Synthesis Example 4, cellulose acetate propionate (introduction ratio (degree of substitution) of propionyl group DS=2.49, introduction ratio (degree of substitution) of acetyl group DS=0.18, manufactured by Eastman Chemical Company, trade name: CAP-482-20, weight average molecular weight 120,000 (in terms of standard polystyrene), number average molecular weight=39,000 (in terms of standard polystyrene))

PBS resin: polybutylene succinate (manufactured by PTTMCC Biochem Co., Ltd., trade name: FZ71PM)

Carbon Black 1 (CB1): Acidic carbon black (average particle size: 13 nm, pH3) (manufactured by Mitsubishi Chemical Corporation, trade name: Mitsubishi Carbon Black #2650)

Carbon Black 2 (CB2): Neutral carbon black (average particle size: 13 nm, pH6.5) (manufactured by Mitsubishi Chemical Corporation, trade name: Mitsubishi Carbon Black #2600)

Urea Compound (B1a): A urea component formed in the process of introducing a long chain organic group according to the methods described in Synthesis Examples 1 to 3.

Urea Compound (B1b): A urea compound prepared according to the method described in Synthesis Example 5.

Amide compound (B2a): Stearamide (manufactured by Kao Corporation, product name: Fatty acid amide S)

Amide compound (B2b): Ethylene bis stearamide (Kao Corporation, product name: Kao Wax EB-FF)

Fatty acid metal salt (B3a): calcium stearate (manufactured by NOF Corporation, product name: Calcium stearate S)

Fatty acid metal salt (B3b): zinc stearate (manufactured by NOF Corporation, trade name: NISSAN ELECTOL MZ-2)

Fatty acid metal salt (B3c): magnesium stearate (manufactured by NOF Corporation, product name: Magnesium stearate GP)

Fatty acid metal salt (B3d): aluminum monostearate (manufactured by NOF Corporation, product name: Aluminum stearate 300)

Fatty acid metal salt (B3e): aluminum distearate (manufactured by NOF Corporation, product name: Aluminum stearate 600)

Fatty acid metal salt (B3f): aluminum tristearate (manufactured by NOF Corporation, product name: Aluminum stearate 900)

Fatty acid metal salt (B3g): zinc laurate (manufactured by NOF Corporation, Ltd., product name: Zinc laurate GP)

Silicone-based lubricant (B4): GENIOPLAST PELLET S (trade name) manufactured by Wacker Asahikasei Silicone Co., Ltd.

Synthesis Example 1

A cellulose derivative (C1) was synthesized by mixing 500 g of cellulose acetate propionate (manufactured by Eastman Chemical Company, trade name: CAP482-20, DS of propionyl group=2.49, DS of acetyl group=0.18) with 15.8 g of octadecyl isocyanate and 0.25 g of dibutyl tin dilaurate, and then introducing the mixture into a small twin-screw continuous-type kneader (manufactured by Kurimoto, LTD., product name: 51 KRC Kneader, hereinafter referred to as "kneader") at 200° C. to perform the reaction of the mixture while melting it. The moisture necessary for the formation of a urea component is supplied from moisture contained in cellulose acetate propionate or moisture in the atmosphere.

The degree of substitution $DS_{LO}$ of the long-chain organic group introduced in the cellulose derivative (C1) was obtained by $^1$H-NMR, and as a result, $DS_{LO}$=0.005.

The amount of urea component (B1a) formed was 2.6% by mass in the obtained cellulose derivative (2.7 parts by mass with respect to 100 parts by mass of the cellulose derivative), as a result of calculating based on the amount of unreacted isocyanate calculated from the charge amount and the degree of substitution $DS_{LO}$ of the long-chain organic group, assuming that all of the unreacted isocyanate was converted into a urea.

Synthesis Example 2

A cellulose derivative (C2) was synthesized by mixing 500 g of the same cellulose acetate propionate as used in Synthesis Example 1, 47.3 g of octadecyl isocyanate and 0.25 g of dibutyl tin dilaurate, and then introducing the mixture into the kneader at 200° C. to perform the reaction of the mixture while melting it in the same manner as in Synthesis Example 1.

The degree of substitution $DS_{LO}$ of the long-chain organic group introduced in the cellulose derivative (C2) was obtained by $^1$H-NMR, and as a result, $DS_{LO}$=0.023.

The amount of the urea component (B1a) produced was calculated in the same manner as in Synthesis Example 1, and as a result, it was 6.6% by mass in the obtained cellulose derivative (7.1 parts by mass with respect to 100 parts by mass of the cellulose derivative).

Synthesis Example 3

A cellulose derivative (C3) was synthesized by mixing 530 g of the same cellulose acetate propionate as used in Synthesis Example 1, 166 g of octadecyl isocyanate and 0.26 g of dibutyl tin dilaurate, and then introducing the mixture into the kneader at 200° C. to perform the reaction of the mixture while melting it in the same manner as in Synthesis Example 1.

The degree of substitution $DS_{LO}$ of the long-chain organic group introduced in the cellulose derivative (C3) was obtained by $^1$H-NMR, and as a result, $DS_{LO}$=0.068.

The amount of the urea component (B1a) produced was calculated in the same manner as in Synthesis Example 1, and as a result, it was 7.7% by mass in the obtained cellulose derivative (8.3 parts by mass with respect to 100 parts by mass of the cellulose derivative).

Synthesis Example 4

Cellulose (powdered pulp, moisture content 6.4%), 5.4 g (in terms of dry weight) was put in a reactor, dispersed in 71.1 mL of N-methylpyrrolidone and 9.9 mL of pyridine in a nitrogen atmosphere, and stirred overnight at room temperature for activation. Thereafter, the solution containing the dispersed cellulose was cooled to about −10° C., and 5.04 g of stearoyl chloride and 9.24 g of propionyl chloride were mixed beforehand and introduced into the reactor. After stirring with heating at 90° C. for 4 hours, the mixture was cooled to 65° C., 81 mL of methanol was added, and the mixture was stirred for about 30 minutes. An additional 18 mL of water was added to precipitate the product, which was collected by suction filtration. The resulting solid was washed with 65 mL of methanol until the color of the filtrate disappeared. The washed solid was dried in vacuo at 105° C. for 5 hours to obtain 10.9 g of a powdery cellulose derivative (C4). It was measured by $^1$H-NMR, and as a result, the degree of substitution $DS_{SH}$ of the short-chain organic group of the cellulose derivative (C4) is 2.2 and the degree of substitution $DS_{Lo}$ of the long-chain organic group is 0.33.

Synthesis Example 5

After 200 g of octadecyl isocyanate was dissolved in 200 g of 1,4-dioxane, 0.40 g of dibutyltin dilaurate and 10 mL of water were added thereto, and the mixture was stirred at room temperature overnight to obtain a white turbid solution. Thereafter, a white solid was collected by suction filtration of the white turbid solution, and an unreacted substance was removed by dispersing the white solid in chloroform and performing suction filtration. The washed white solid was dried under vacuum at 105° C. for 2 hours to obtain a urea compound (Bib) represented by the following formula.

[Formula 6]

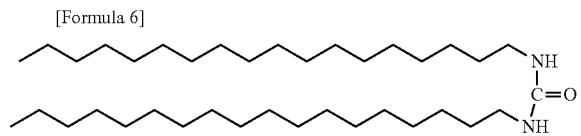

(Production of Resin Composition and Molded Body/Preparation of Samples for Evaluation)

Examples 1 to 3

For Examples 1 to 3, each mixture formed using the materials at the composition ratios shown in Table 1 was put into the kneader, kneaded at 200° C., water-cooled and recovered to form pellets. The resulting pellets were dried at 110° C. for 2 hours.

Component B1a is included in the cellulose derivatives obtained in Synthesis Examples 1 to 3.

Examples 4 to 21

For Examples 4 to 21, the materials shown in Tables 2 to 4 were prepared, and each mixture formed at the composition ratios shown in Tables 2 to 4 was put into a kneader, kneaded at 200° C., water-cooled and recovered to form pellets. The resulting pellets were dried at 110° C. for 2 hours.

Comparative Example 1

For Comparative Example 1, pellets were obtained in the same manner as in Examples 1 to 3, except that the materials shown in Table 1 were prepared and the mixture formed at the composition ratio shown in Table 1 was used.

Comparative Example 2

For Comparative Example 2, pellets were obtained in the same manner as in Examples 4 to 21, except that the materials shown in Table 2 were prepared and the mixture formed at the composition ratio shown in Table 2 was used.

<Molding Method: Press Molding>

The obtained pellets were again dried at 110° C. for 2 hours immediately before molding and then put in use, and molded by a hot press molding machine (manufactured by TESTER SANGYO Co., Ltd., product name: SA-303 Tabletop Test Press type-S) at 190° C., to produce a press molded film having a circular shape with a thickness of 0.3 mm and a diameter of 100 mm. A mold having a surface roughness Ra=1 nm prepared by mirror polishing treatment (surface roughness was evaluated by a laser microscopy OLS4100 (product name) manufactured by OLYMPUS Corporation) was used.

(Measurement of Glossiness)

The 20° specular gloss (GS20°) of the evaluation sample obtained was measured by a gloss meter (product name: Gloss meter GM-268Plus, manufactured by Konica Minolta, Inc., compatible specifications: ISO 2813, ISO 7668, ASTM D 523, ASTM D 2457, DIN 67 530, JIS Z 8741, BS 3900, BS 6161 (Part12)).

(Gauze Friction Test)

A change in glossiness was evaluated by adding friction to the obtained evaluation sample using the friction tester (manufactured by Yasuda Seiki Seisakusho, Ltd., product name: crock meter (friction tester I type)), as follows.

First, two sheets of general medical device medical gauze type I that is 100% cotton gauze were stacked and fixed to the frictional element of the friction tester. The load of the frictional element was 8.83N (900 gf), the diameter of the frictional element was 16 mm, the friction distance was 100 mm, the friction speed was 60 times/min.

As friction resistance, the case in which the retention rate of glossiness after friction (glossiness after friction/glossiness before friction ×100) is 95% or more is designated as "○", the case in which the retention rate is 70% or more and less than 95% is designated as "Δ", and the case in which the retention rate is less than 70% is designated as "×".

The number of times of friction was set to 200.

TABLE 1

| | Cellulose derivative (A) | | | Composition ratio (parts by mass) | | | | | | Thermoplasticity (MFR 200° C., 5 kgf) |
|---|---|---|---|---|---|---|---|---|---|---|
| | Type | $DS_{SH}$ | $DS_{Lo}$ | A | PBS resin | CB1 | B1a | Glossiness | Friction resistance | |
| Example 1 | C1 | 2.67 | 0.005 | 100 | 0 | 1 | 2.7 | 77.6 | Δ | 3.7 |
| Example 2 | C2 | 2.67 | 0.023 | 100 | 0 | 1 | 7.1 | 78.5 | ○ | 16 |
| Example 3 | C3 | 2.67 | 0.068 | 100 | 0 | 1 | 8.3 | 79.3 | ○ | 53 |
| Comparative Example 1 | CAP482-20 | 2.67 | 0 | 80 | 20 | 1 | 0 | 79.3 | × | 18 |

TABLE 2

| | Cellulose derivative (A) | | | Composition ratio (parts by mass) | | | | | | | | Friction resistance | Thermoplasticity (MFR 200° C., 5 kgf) |
|---|---|---|---|---|---|---|---|---|---|---|---|---|---|
| | 種類 | $DS_{SH}$ | $DS_{Lo}$ | A | CB1 | B1b | B2a | B2b | B3a | B4 | Glossiness | | |
| Example 4 | C4 | 2.2 | 0.33 | 100 | 1 | 1.5 | 0 | 0 | 0 | 0 | 78.2 | ○ | 59 |
| Example 5 | C4 | 2.2 | 0.33 | 100 | 1 | 2.0 | 0 | 0 | 0 | 0 | 78.3 | ○ | 74 |
| Example 6 | C4 | 2.2 | 0.33 | 100 | 1 | 2.5 | 0 | 0 | 0 | 0 | 76.4 | ○ | 61 |
| Example 7 | C4 | 2.2 | 0.33 | 100 | 1 | 0 | 2.5 | 0 | 0 | 0 | 77.7 | ○ | 66 |
| Example 8 | C4 | 2.2 | 0.33 | 100 | 1 | 0 | 0 | 2.5 | 0 | 0 | 76.0 | Δ | 53 |
| Example 9 | C4 | 2.2 | 0.33 | 100 | 1 | 0 | 0 | 5 | 0 | 0 | 77.9 | ○ | 59 |
| Example 10 | C4 | 2.2 | 0.33 | 100 | 1 | 0 | 0 | 0 | 1 | 0 | 78.5 | Δ | 28 |
| Example 11 | C4 | 2.2 | 0.33 | 100 | 1 | 0 | 0 | 0 | 2.5 | 0 | 75.8 | ○ | 27 |
| Example 12 | C4 | 2.2 | 0.33 | 100 | 1 | 0 | 0 | 0 | 5 | 0 | 77.0 | ○ | 24 |
| Example 13 | C4 | 2.2 | 0.33 | 100 | 1 | 0 | 0 | 0 | 0 | 5 | 73.6 | ○ | 21 |
| Comparative Example 2 | C4 | 2.2 | 0.33 | 100 | 1 | 0 | 0 | 0 | 0 | 0 | 80.4 | × | 64 |

TABLE 3

| | Cellulose derivative (A) | | | Composition ratio (parts by mass) | | | | | | | | | Friction resistance |
|---|---|---|---|---|---|---|---|---|---|---|---|---|---|
| | Type | $DS_{SH}$ | $DS_{Lo}$ | A | CB1 | B3b | B3c | B3d | B3e | B3f | B3g | Glossiness | |
| Example 14 | C4 | 2.2 | 0.33 | 100 | 1 | 2.5 | 0 | 0 | 0 | 0 | 0 | 76.8 | Δ |
| Example 15 | C4 | 2.2 | 0.33 | 100 | 1 | 0 | 2.5 | 0 | 0 | 0 | 0 | 77.3 | ○ |
| Example 16 | C4 | 2.2 | 0.33 | 100 | 1 | 0 | 0 | 2.5 | 0 | 0 | 0 | 78.7 | Δ |
| Example 17 | C4 | 2.2 | 0.33 | 100 | 1 | 0 | 0 | 0 | 2.5 | 0 | 0 | 78.1 | Δ |
| Example 18 | C4 | 2.2 | 0.33 | 100 | 1 | 0 | 0 | 0 | 0 | 2.5 | 0 | 77.6 | Δ |
| Example 19 | C4 | 2.2 | 0.33 | 100 | 1 | 0 | 0 | 0 | 0 | 0 | 2.5 | 77.9 | Δ |

TABLE 3-continued

| | Cellulose derivative (A) | | | Composition ratio (parts by mass) | | | | | | | | | Friction |
| --- | --- | --- | --- | --- | --- | --- | --- | --- | --- | --- | --- | --- | --- |
| | Type | $DS_{SH}$ | $DS_{Lo}$ | A | CB1 | B3b | B3c | B3d | B3e | B3f | B3g | Glossiness | resistance |
| Comparative Example 2 | C4 | 2.2 | 0.33 | 100 | 1 | 0 | 0 | 0 | 0 | 0 | 0 | 80.4 | x |

TABLE 4

| | Cellulose derivative (A) | | | Composition ratio (parts by mass) | | | | Friction | |
| --- | --- | --- | --- | --- | --- | --- | --- | --- | --- |
| | Type | $DS_{SH}$ | $DS_{Lo}$ | A | CB1 | CB2 | B1b | Glossiness | resistance |
| Example 6 | C4 | 2.2 | 0.33 | 100 | 1 | 0 | 2.5 | 76.4 | ○ |
| Example 20 | C4 | 2.2 | 0.33 | 100 | 0 | 1 | 2.5 | 77.1 | ○ |
| Example 21 | C4 | 2.2 | 0.33 | 100 | 0 | 0 | 2.5 | 78.2 | ○ |
| Comparative Example 2 | C4 | 2.2 | 0.33 | 100 | 1 | 0 | 0 | 80.4 | x |

From Table 1, it can be seen that the molded bodies obtained by using the resin compositions of Examples 1 to 3 containing the urea component (B1a) have good friction resistance as compared with Comparative Example 1 containing no urea component (B1a), while having thermoplasticity.

Table 2 shows the case (Examples 4 to 13) in which the type of and the addition amount of the lubricant are changed based on the cellulose derivative C4, and the case (Comparative Example 2) in which the lubricant is not included. Comparison between Examples 4 to 13 and Comparative Example 2 shows that by adding urea compound (B1b), stearamide (B2a), ethylene bis stearamide (B2b), calcium stearate (B3) or silicone-based lubricant (B4), thermoplastic resin compositions having good abrasion resistance can be obtained.

In Examples 4 to 6 (content of urea compound: 1.5 to 2.5 parts by mass), it is understood that the abrasion resistance was improved when the composition ratio (content) of urea compound (B1b) is 1.5 parts by mass or more (1.5% by mass or more with respect to cellulose derivative (A)) as compared with Comparative Example 2 (no lubricant). In Examples 10 to 12 (content of aliphatic metal salt: 1 to 5 parts by mass), it is understood that the abrasion resistance was improved when the composition ratio (content) of the aliphatic metal salt (B3a) is 1 part by mass or more (1% by mass or more with respect to the cellulose derivative (A)) as compared with Comparative Example 2 (no lubricant).

From Table 3, it can be seen that the molded bodys obtained by using the resin compositions of the examples improved the friction resistance without greatly impairing the appearance (glossiness) as compared with Comparative Example 2 (no lubricant).

From Table 4, it can be seen that the molded bodys obtained by using the resin compositions of the examples improved the friction resistance without greatly impairing the appearance (glossiness) as compared with Comparative Example 2 (no lubricant).

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

Some or the whole of the above exemplary embodiments can be described also as the following exemplary embodiments, but is not limited to the following.

Further Exemplary Embodiment 1

A cellulose resin composition comprising a cellulose derivative (A) and a lubricant (B), wherein
the cellulose derivative (A) is a cellulose derivative obtained by substituting at least a part of hydrogen atoms of hydroxy groups of a cellulose with a short-chain organic group having 2 to 4 carbon atoms and a long-chain organic group having 8 to 30 carbon atoms with degrees of substitution satisfying the following formulas:

$$2.0 \leq DS_{SH} \leq 2.7$$

$$0.003 \leq DS_{LO}$$

$$2.4 \leq DS_{SH} + DS_{LO} \leq 3$$

where $DS_{SH}$ represents the degree of substitution with the short-chain organic group, and $DS_{LO}$ represents the degree of substitution with the long-chain organic group;
the lubricant (B) is at least one selected from the group consisting of a urea compound (B1) having a urea group (—NH—C(=O)—NH—) and an acyclic aliphatic group having 6 to 33 carbon atoms, an amide compound (B2) having an amide group (—C(=O)—NH—) and an acyclic aliphatic group having 6 to 33 carbon atoms, a fatty acid metal salt (B3), and a silicone-based lubricant (B4); and
a content of the lubricant (B) is in a range of 0.1 to 10% by mass.

Further Exemplary Embodiment 2

The cellulose resin composition according to further exemplary embodiment 1, wherein the short-chain organic group of the cellulose derivative (A) is at least one acyl group selected from the group consisting of an acetyl group, a propionyl group, and a butyryl group.

Further Exemplary Embodiment 3

The cellulose resin composition according to further exemplary embodiment 1 or 2, wherein the long-chain organic group of the cellulose derivative (A) is a group represented by the following formula (L1) or (L2):

$$R—C(=O)— \quad (L1)$$

$$R—NHC(=O)— \quad (L2)$$

where R represents an organic group.

Further Exemplary Embodiment 4

The cellulose resin composition according to any one of further exemplary embodiments 1 to 3, wherein the lubricant (B) comprises the urea compound (B1), and the urea compound (B1) is a urea compound represented by the following formula (N1):

[Formula 7]

(N1)

where n and m each independently represent an integer from 6 to 33.

Further Exemplary Embodiment 5

The cellulose resin composition according to any one of the further exemplary embodiments 1 to 3, wherein the lubricant (B) comprises the amide compound (B2), and the amide compound (B2) is at least one of a monoamide compound represented by the following formula (N2) and a bisamide compound represented by the following formula (N3):

where p represents an integer from 6 to 33,

[Formula 8]

(N2)

[Formula 9]

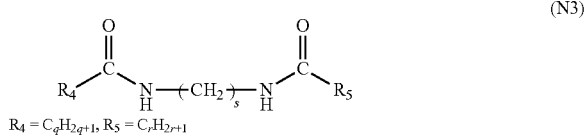

(N3)

where q and r each independently represent integers from 6 to 33, and s represent integers from 1 to 6.

Further Exemplary Embodiment 6

The cellulose resin composition according to any one of further exemplary embodiments 1 to 3, wherein the lubricant (B) comprises a fatty acid metal salt (B3), and the fatty acid metal salt (B3) is a fatty acid metal salt having a melting point in the range of 100 to 200° C. or a molecular weight of at least 500.

Further Exemplary Embodiment 7

The cellulose resin composition according to any one of further exemplary embodiments 1 to 3, wherein the lubricant (B) comprises a fatty acid metal salt (B3), and the fatty acid metal salt (B3) is at least one selected from the group consisting of calcium stearate, zinc stearate, magnesium stearate, aluminum monostearate, aluminum distearate, aluminum tristearate, and zinc laurate.

Further Exemplary Embodiment 8

The cellulose resin composition according to any one of further exemplary embodiments 1 to 3, wherein the lubricant comprises a silicone-based lubricant (B4), and the silicone-based lubricant (B4) is a silicone-based lubricant containing silica.

Further Exemplary Embodiment 9

The cellulose resin composition according to any one of further exemplary embodiments 1 to 8, further comprising a colorant.

Further Exemplary Embodiment 10

The cellulose resin composition according to further exemplary embodiment 9, wherein the colorant is a black colorant.

Further Exemplary Embodiment 11

The cellulose resin composition according to further exemplary embodiment 10, wherein the black colorant is a carbon black.

Further Exemplary Embodiment 12

A molded body formed by using the cellulose resin composition described in any one of further exemplary embodiments 1 to 11.

Further Exemplary Embodiment 13

A product using the molded body described in further exemplary embodiment 12.

Further Exemplary Embodiment 14

A method for producing a cellulose resin composition comprising a cellulose derivative (A) and a lubricant (B), wherein the cellulose derivative (A) is a cellulose derivative obtained by substituting at least a part of hydrogen atoms of hydroxy groups of a cellulose with a short-chain organic group having 2 to 4 carbon atoms and a long-chain organic group having 8 to 30 carbon atoms including an acyclic aliphatic group having 7 carbon atoms or more, the lubricant (B) comprises a urea compound (B1) having a urea group (—NH—C(=O)—NH—) and an acyclic aliphatic group having 7 carbon atoms or more carbons, the production method comprises mixing a short-chain bonded cellulose derivative obtained by introducing an acyl group having 2 to 4 carbon atoms into a cellulose, an aliphatic isocyanate compound having an acyclic aliphatic group having 7 carbon atoms or more, water, and a reaction catalyst, and melt kneading to form the cellulose derivative (A), to which the long-chain organic group and the short-chain organic group are bonded, and the urea compound (B1).

Further Exemplary Embodiment 15

The method for producing a cellulose resin composition according to further exemplary embodiment 14, wherein the urea compound (B1) is a urea compound represented by the following formula (N1):

[Formula 10]

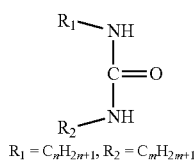

(N1)

where n and m each independently represent an integer of 7 to 29.

Further Exemplary Embodiment 16

The method for producing a cellulose resin composition according to further exemplary embodiment 14 or 15, wherein the cellulose derivative (A) is a cellulose derivative obtained by substituting at least a part of hydrogen atoms of hydroxy groups of a cellulose is substituted by the long-chain organic group and the short-chain organic group with degrees of substitution satisfying the following formula:

$2.0 \leq DS_{SH} \leq 2.7$ $0.003 \leq DS_{LO}$ $2.4 \leq DS_{SH} + DS_{LO} \leq 3$ where $DS_{SH}$ represents the degree of substitution with the short-chain organic group, and $DS_{LO}$ represents the degree of substitution with the long-chain organic group.

This application claims the right of priority based on Japanese Patent Application No. 2017-241069, filed Dec. 15, 2017, the entire content of which is incorporated herein by reference.

The invention claimed is:

1. A cellulose resin composition comprising a cellulose derivative (A) and a lubricant (B), wherein the cellulose derivative (A) is a cellulose derivative obtained by substituting at least a part of hydrogen atoms of hydroxy groups of a cellulose with a short-chain organic group having 2 to 4 carbon atoms and a long-chain organic group having 8 to 30 carbon atoms with degrees of substitution satisfying the following formulas:

$2.0 \leq DS_{SH} \leq 2.7$ $0.003 \leq DS_{LO}$ $2.4 \leq DS_{SH} + DS_{LO} \leq 3$ where $DS_{SH}$ represents the degree of substitution with the short-chain organic group, and $DS_{LO}$ represents the degree of substitution with the long-chain organic group;

the lubricant (B) is at least one selected from the group consisting of a urea compound (B1) having a urea group (—NH—C(=O)—NH—) and an acyclic aliphatic group having 6 to 33 carbon atoms, an amide compound (B2) having an amide group (—C(=O)—NH—) and an acyclic aliphatic group having 6 to 33 carbon atoms, a fatty acid metal salt (B3), and a silicone-based lubricant (B4); and a content of the lubricant (B) is in a range of 0.1 to 10% by mass.

2. The cellulose resin composition according to claim 1, wherein the lubricant (B) comprises the urea compound (B1), and the urea compound (B1) is a urea compound represented by the following formula (N1):

[Formula 1]

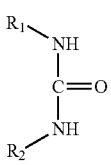

(N1)

where n and m each independently represent an integer from 6 to 33.

3. The cellulose resin composition according to claim 1, wherein the lubricant (B) comprises the amide compound (B2), and the amide compound (B2) is at least one of a monoamide compound represented by the following formula (N2) and a bisamide compound represented by the following formula (N3):

[Formula 2]

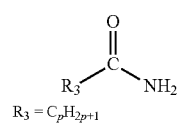

(N2)

where p represents an integer from 6 to 33,

[Formula 3]

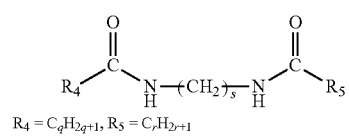

(N3)

where q and r each independently represent an integer from 6 to 33, and s represent an integer from 1 to 6.

4. The cellulose resin composition according to claim 1, wherein the lubricant (B) comprises the fatty acid metal salt (B3), and the fatty acid metal salt (B3) is at least one selected from the group consisting of calcium stearate, zinc stearate, magnesium stearate, aluminum monostearate, aluminum distearate, aluminum tristearate, and zinc laurate.

5. The cellulose resin composition according to claim 1, wherein the lubricant comprises a silicone-based lubricant (B4), and the silicone-based lubricant (B4) is a silicone-based lubricant containing silica.

6. The cellulose resin composition according to claim 1, further comprising a colorant.

7. The cellulose resin composition of claim 6, wherein the colorant is a carbon black.

8. The cellulose resin composition according to claim 6, wherein the colorant is a black colorant.

9. A molded body formed by using the cellulose resin composition according to claim 1.

10. A product using the molded body according to claim 9.

11. The cellulose resin composition according to claim 1, wherein the short-chain organic group of the cellulose derivative (A) is at least one acyl group selected from the group consisting of an acetyl group, a propionyl group, and a butyryl group.

12. The cellulose resin composition according to claim 1, wherein the long-chain organic group of the cellulose derivative (A) is a group represented by the following formula (L1) or (L2):

$$R-C(=O)- \qquad (L1)$$

$$R-NHC(=O)- \qquad (L2)$$

where R represents an organic group.

\* \* \* \* \*